(12) United States Patent
Ghinamo

(10) Patent No.: US 9,316,740 B2
(45) Date of Patent: Apr. 19, 2016

(54) METHOD AND SYSTEM FOR LOCALIZING MOBILE COMMUNICATIONS TERMINALS

(75) Inventor: Giorgio Ghinamo, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 434 days.

(21) Appl. No.: 13/993,798

(22) PCT Filed: Dec. 13, 2010

(86) PCT No.: PCT/EP2010/069503
§ 371 (c)(1),
(2), (4) Date: Jun. 13, 2013

(87) PCT Pub. No.: WO2012/079616
PCT Pub. Date: Jun. 21, 2012

(65) Prior Publication Data
US 2013/0265191 A1 Oct. 10, 2013

(51) Int. Cl.
*G01S 19/40* (2010.01)
*G01S 19/42* (2010.01)

(52) U.S. Cl.
CPC ............... *G01S 19/40* (2013.01); *G01S 19/42* (2013.01); *G01S 19/426* (2013.01)

(58) Field of Classification Search
CPC .......... G01S 19/09; G01S 19/40; G01S 19/42
USPC ............. 342/357.21, 357.23, 357.25, 357.46, 342/357.71; 701/468, 469
See application file for complete search history.

(56) References Cited

U.S. PATENT DOCUMENTS

| | | |
|---|---|---|
| 2004/0034465 A1 | 2/2004 | Spiesberger |
| 2004/0203853 A1 | 10/2004 | Sheynblat |
| 2005/0206566 A1 | 9/2005 | Stilp et al. |
| 2007/0159384 A1 | 7/2007 | Kangas |
| 2007/0225937 A1 | 9/2007 | Spiesberger |
| 2009/0006030 A1 | 1/2009 | Spiesberger |
| 2010/0173647 A1 | 7/2010 | Sheynblat |
| 2010/0318318 A1 | 12/2010 | Spiesberger |

FOREIGN PATENT DOCUMENTS

| | | |
|---|---|---|
| WO | 03 092319 | 11/2003 |
| WO | 2010 034351 | 4/2010 |

OTHER PUBLICATIONS

International Search Report Issued Sep. 19, 2011 in PCT/EP10/069503 Filed Dec. 13, 2010.

*Primary Examiner* — Dao Phan
(74) *Attorney, Agent, or Firm* — Oblon, McClelland, Maier & Neustadt, L.L.P.

(57) ABSTRACT

A method of determining a geographic position of a user terminal including a receiver of signals of a global navigation satellite system, the method including the user terminal: performing pseudo-range measurements related to a plurality of signals received from transmitters of the global navigation satellite system; calculating a first estimated position thereof by a weighted least square method; calculating post-fit residuals for the first estimated position; comparing the calculated post-fit residuals to a first threshold and: in case the first threshold is exceeded, calculating a second estimated position using a Monte-Carlo method, otherwise retaining the first estimated position as the geographic position of the mobile communications terminal.

8 Claims, 3 Drawing Sheets

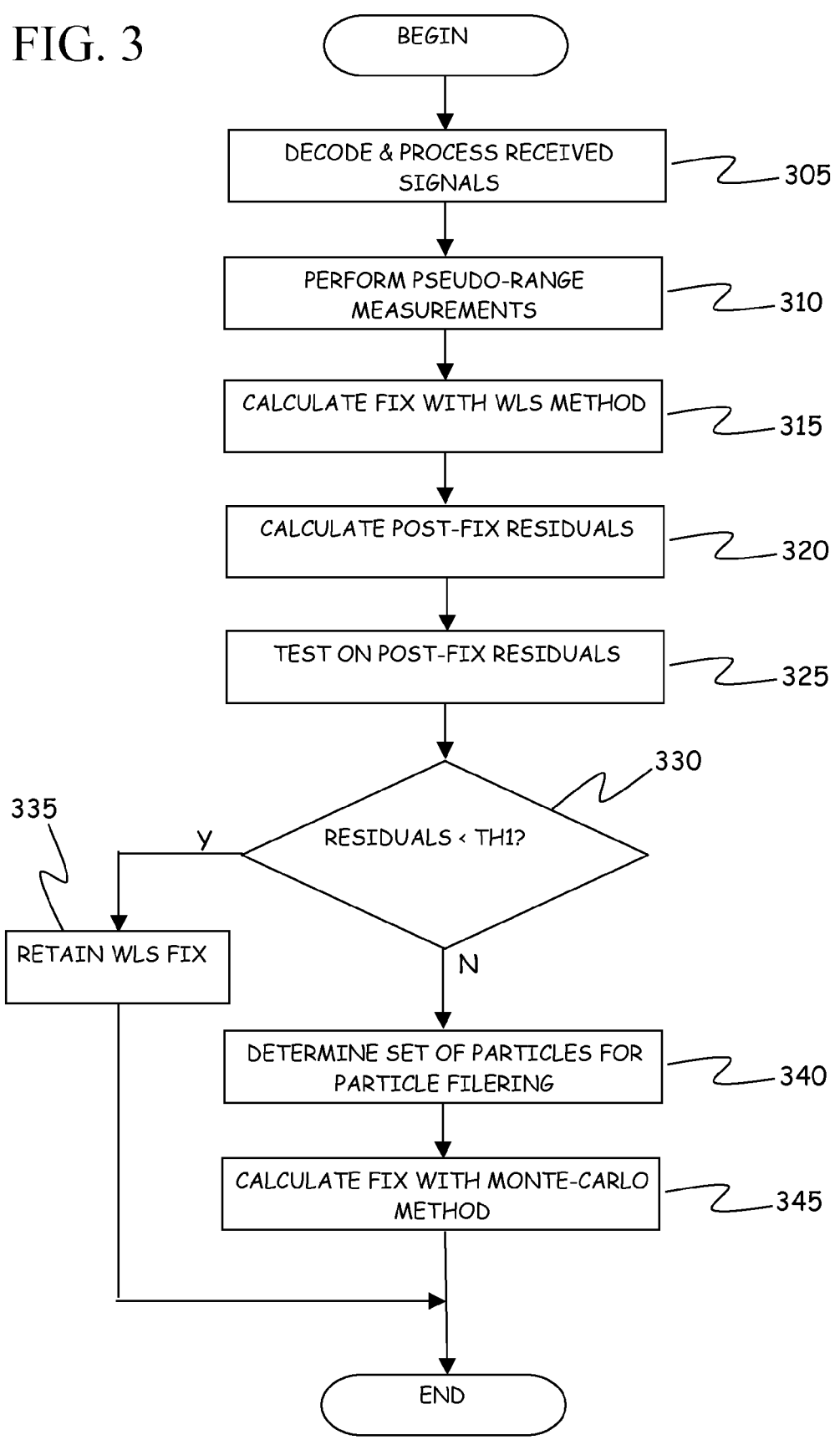

METHOD AND SYSTEM FOR LOCALIZING MOBILE COMMUNICATIONS TERMINALS

BACKGROUND OF THE INVENTION

1. Field of the Invention

The present invention generally relates to techniques for the geographic localization (geolocation) of mobile communications terminals like cellular phones, smart phones and the like based on GNSS (Global Navigation Satellite Systems). More specifically, the invention concerns a method and a system for increasing the accuracy of the estimation of the geographic position of mobile communications terminals.

2. Description of the Related Art

Determining the geographic position of (La, geographically localizing) mobile communications terminals like cellular phones, smart phones and similar handheld devices operable with mobile communications networks can be exploited in a variety of services and applications, such as location-sensitive yellow-pages services (e.g., exploiting the known location of a mobile terminal for providing to the user information about restaurants, hotels, etc. in his/her location neighborhood), services offered to communities of users (e.g., friend/family member find services), location-sensitive call billing schemes. The capability of geographically locating mobile communications terminals is also of great importance in case of emergency calls and/or for tracking specific classes of users, like for example elders and children.

Several techniques are known in the art that allow the geographic localization of mobile terminals.

Satellite-based geolocation systems like the GPS (Global Positioning System) are an effective solution for geographically localizing mobile communication terminals, since the integration of GPS receivers in smart phones is now very common.

As known in the art, the GPS comprises a "constellation" of satellites that orbit around the earth; each GPS satellite carries a GPS transmitter that transmits GPS signals encoded with information allowing GPS receivers on earth to measure the time of arrival of the received signals with respect to an arbitrary point in time: this relative time-of-arrival measurement may then be converted into a "pseudo-range" measure (a measure of the apparent propagation time from the satellite to the GPS receiver, expressed as a distance).

The position (latitude, longitude, height) and the clock offset (the offset between the receiver clock and the GPS system clock) of a GPS receiver may be accurately estimated based on a sufficient number of available pseudo-range measurements (typically four). Calculating the position (the so-called "GPS fix") of a GPS receiver involves solving a system of equations where the unknown variables are the GPS receiver geographic coordinates to be determined and the clock offset.

The GPS performance is rather good in open-sky conditions when the number of received signals is equal to or greater than five and all the received signals are in "Line Of Sight" (LOS). Depending on the specific signal processing techniques and the algorithms for estimating the PVT (Position-Velocity-Time) implemented at the GPS receiver, the localization accuracy may in these conditions vary from approximately 2 m to few millimeters.

However, GPS signals are normally received at very low power levels, due to the relatively large distances between the satellites and the receivers, and in particular the GPS signal received by GPS receivers is highly attenuated when the receivers happen to be inside a building, under dense foliage, in urban settings in which tall buildings block much of the sky visibility (so called "urban canyons"), and so on. Since mobile communications terminals are very often used in such environments, the capability of implementing geolocation services involves the possibility of exploiting the GPS in environments where the GPS signals are highly attenuated.

The increase in sensitivity of GPS receivers has made it possible to use the GPS also not in open-sky, LOS conditions, as it is normally the case of urban and indoor environments, where there is no direct visibility of the satellites and the GPS signal is received after having been diffracted, reflected and strongly attenuated by surrounding obstacles. GPS techniques in these environments are called High-Sensitivity GPS (HSGPS).

Further improvements in the sensitivity of GPS receivers, as well as the deployment of GNSS complementary to the GPS, like Galileo, are expected to partially overcome the problem of the signals obstruction.

A critical aspect of geographic localization techniques in general, and of mobile terminals in particular, is the accuracy by which the geographic position can be established.

For example, the location of a mobile terminal making an emergency call should be determined as precisely as possible, or at least an indication of the degree of uncertainty associated with the determined location of the mobile terminal should be provided, in order to ease the task of finding where the user who placed the call is, and e.g. quickly rescue him/her. The regulatory authorities of some countries have in this respect also set forth minimum accuracy standards.

Two are the sources of the error affecting the estimation of the geographic position of a GPS receiver: the geometry of the satellites constellation and the noise affecting the pseudo-range measurements. The noise originates from thermal effects and, mainly, from multipath GPS signal propagation components that are superimposed to the main GPS signal, as well as from non-LOS propagation paths due to obstacles (which cause signal diffraction). An accurate statistical modeling of the noise would allow to significantly improve the accuracy of the position estimation. Thermal noise is white noise that can be modeled by means of a Gaussian distribution, and its impact on the code-phase measures (i.e., the measures of time delay corresponding to a phase difference between an individual scrambling code used by each satellite to modulate the signal to transmit and a corresponding scrambling code used to modulate a signal locally generated at the receiver for the signal acquisition purposes) can be estimated based on characteristic parameters of the specific signal processing algorithm implemented at the receiver. Noise originating from multipath and non-LOS signal propagation, unlike thermal noise, cannot be modeled as white noise, because it depends on the specific signal propagation environment; since this is the most relevant noise source, the capability of accurately estimating the receiver position greatly depends on the capability of modeling also this type of noise.

It has been shown that an empirical model such as to account for multipath propagation and diffraction effects may be effective and capable of providing good noise estimations. Such empirical model can be approximated by a Gaussian distribution, with average value and variance that depend on the strength of the received signal.

When a Gaussian modeling of the error affecting the pseudo-range measures is available, the position of the GPS receiver can be estimated using the Weighted Least Square (WLS) method (see for example A. Dalla Torre et al, "Analysis of the Accuracy of Indoor GNSS Measurements and Positioning Solution", European Navigation Conference—ENC—2008, Toulouse, Apr. 23-25, 2008), which allows finding a solution to the above-mentioned system of equations which minimizes the squared error of the measures, by weighting each measure with the inverse of the square of the variance.

Kalman filtering techniques can also be adopted for enhancing the estimation of the error affecting the calculated GPS fix. Actually, the use of Kalman filtering is possible under the assumption that the errors at different times are not correlated, something that is not true in the GPS, particularly when applied to the localization of mobile GPS receivers, like those embedded in mobile communications terminals (because the mobile terminals generally move at relatively low speed, of the order of 1 m/s); nevertheless, mathematical stratagems have been proposed that allows applying Kalman filtering also in the GPS (see for example M. G. Petovello et al, "Quantifying Ambiguity Resolution in the Presence of Time-Correlated Measurement Errors Using Geometric-Based Techniques", in Proceedings of the 61st Institute of Navigation Annual Meeting, pp. 1073-1085, Cambridge, Mass., USA, June 2005).

By using an empirical model of the noise which is valid for heterogeneous environments, the error affecting the estimated geographic position can be strongly reduced. However, it has been shown that the approximation of the error by a Gaussian distribution is sufficiently accurate and effective for errors (i.e., measure confidence intervals) not greater than 90%-95%, corresponding to approximately twice the variance (see cited paper of A. Dalla Torre et al). For errors greater than twice the variance, the distribution is completely different from a Gaussian, and the WLS method is no longer effective.

When the number of different satellite transmitter signals received by a GPS receiver is higher than the number of unknown variables in the mathematical system of equations to be solved for calculating the GPS fix (typically, when pseudo-range measurements for more than four satellites are available at the GPS receiver), the quality of the calculated GPS fix can be assessed by conducting a statistical test (so-called "integrity test") on the post-fit residuals, which are the differences between the measured pseudo-range values and the expected pseudo-range values calculated on the basis of the obtained GPS fix. The integrity test checks whether the sum of the squares of the post-fit residuals, normalized to the hypothesized variance of the pseudo-range measurements, is less than a preset threshold, that depends on the degrees of freedom (number of available pseudo-range measurements less the number of unknown variables in the equations system to be solved). If the error can be modeled by a Gaussian distribution, the sum of the squares of the post-fix residuals has a distribution called "$\chi^2$". For values of the sum of the squares of the post-fit residuals exceeding a given threshold the errors are no longer Gaussian and thus it is possible to determine that the WLS method is not effective.

The described technique for obtaining an estimation of the overall quality of the pseudo-range measures calls for analyzing the individual post-fit residuals to assess whether there are residuals values that do not match with those expected for a Gaussian distribution of the errors. If this test indicates that there are gross errors ("outliers") in the pseudo-range measures, a Gaussian model cannot be adopted to describe the errors, and also in this case the WLS method is not effective.

It is known that in those cases where the error affecting measurements is not Gaussian, the Monte Carlo method can be used. In brief, the Monte Carlo method applied to PVT estimation calls for defining an n-dimensional space of possible solutions, where n is the number of variables in the system of equations to be solved; in the GPS case, the variables are the latitude, longitude, height and clock offset—the difference between the GPS time and the local time at the receiver. A sufficiently dense set of possible solutions (so-called "particles") are defined within this space: given a set of pseudo-range measurements, each one characterized by its own distribution of the error, for each particle in such a set the respective probability is estimated depending on the measures performed by the receiver and on the error model. The final point in the space of solutions is then calculated as the weighted average of all the particles.

When the errors at different times are not correlated, it is advantageous to use the sequential Monte Carlo method, also known as "Particle Filter" method, which, like the Kalman filtering technique for Gaussian error distributions, allows enhancing the estimation of the error affecting the measurements (see for example M. Sanjeev Arulampalam et al, "A Tutorial on Particle Filters for Online Nonlinear/Non-Gaussian Bayesian Tracking", IEEE Trans. On Signal Processing, Vol. 50, No. 2, February 2002). Essentially, the probability of the generic particle is calculated as the product of the probabilities estimated on the basis of the measurements made at subsequent time instants.

SUMMARY OF THE INVENTION

The Applicant has tackled the problem of how to improve the accuracy of the estimation of the position of a receiver of a GNSS system, particularly a receiver embedded in a mobile communications terminal like a cellular phone, a smart phone or the like, for the purpose of achieving a precise geographic localizing thereof.

The Applicant has found that by adopting a model of the pseudo-range measurements error which, compared to the Gaussian distribution model, describes more accurately the long tails of the error statistical distribution (errors greater than 90-95%, i.e. greater than 2σ) it is possible to improve the accuracy of the position estimation by exploiting, as an alternative to the WLS method, the Monte-Carlo method.

In particular, the Applicant has found that it is possible to exploit the post-fit residuals as indicators in a criterion for choosing which PVT method, between the WLS method and the Monte-Carlo method, is more advantageous for accurately estimating the position of the GNSS receiver in order to achieve a better, more accurate fix.

Essentially, according to the present invention, either the WLS or the Monte Carlo methods is exploited, the choice between one or the other method depending on the outcome of a test that allows assessing whether the errors are or not properly described by a Gaussian distribution.

The method according to the present invention thus take advantage of the benefits of both the techniques.

According to an aspect of the present invention, a method is provided of determining a geographic position of a user terminal. The user terminal comprises a receiver of signals of a global navigation satellite system.

The method comprises having the user terminal:
performing pseudo-range measurements related to a plurality of signals received from transmitters of the global navigation satellite system;
calculating a first estimated position thereof by means of a weighted least square method;
calculating post-fit residuals for the first estimated position;
comparing the calculated post-fit residuals to a first threshold and:
in case the first threshold is exceeded, calculating a second estimated position using a Monte-Carlo method, otherwise retaining the first estimated position as the geographic position of the mobile communications terminal.

Said comparing the calculated post-fit residuals to the first threshold may comprise:
  calculating a sum of the squared values of the post-fit residuals, normalized to an expected variance of a Gaussian error model;
  calculating a $\chi^2$ distribution of the post-fit residuals;
  selecting the first threshold as a threshold of the $\chi^2$ distribution corresponding to a first predetermined degree of confidence of the measurements.

The first predetermined degree of confidence may be approximately 67%.

Said calculating a second estimated position using the Monte-Carlo method may comprise defining a width of a set of candidate solutions for the application of the Monte Carlo method, said width depending on information made available as a result of the calculation of the first estimated position using the weighted least square method.

The width of the set of candidate solutions may be defined as follows:
  for values of the summation of the squared post-fit residuals intermediate between the first threshold and a second, higher threshold, choosing a set of candidate solutions limited to an area around the position estimated by the weighted least square method equal to at most approximately 1.5 times the DRMS and the VDOP;
  for values of the summation of the squared post-fit residuals higher than the second threshold, choosing a set of candidate solutions extended to an area around the position estimated by the weighted least square method equal to about 3 times the DRMS and the VDOP.

The second threshold may correspond to a second predetermined degree of confidence of approximately 95%.

Said calculating a second estimated position using a Monte-Carlo method comprises performing a sequential Monte Carlo method by repeatedly applying the Monte-Carlo method for pseudo-range measurements performed at different time instants.

According to another aspect of the present invention, a user terminal is provided, comprising a receiver of signals of a global navigation satellite system and a processor unit configured to:
  performing pseudo-range measurements related to a plurality of signals received from transmitters of the global navigation satellite system;
  calculating a first estimated position thereof by means of a weighted least square method;
  calculating post-fit residuals for the first estimated position;
  comparing the calculated post-fit residuals to a first threshold and:
  in case the first threshold is exceeded, calculating a second estimated position using a Monte-Carlo method, otherwise retaining the first estimated position as the geographic position of the mobile communications terminal.

BRIEF DESCRIPTION OF THE DRAWINGS

These and other features and advantages of the present invention will be made clearer by the following detailed description of some embodiments thereof, provided merely by way of non-limitative examples, description to be read in conjunction with the attached drawings, wherein:

FIG. 3 is a schematic flowchart with the main steps of a method according to an embodiment of the present invention.

DETAILED DESCRIPTION OF EMBODIMENTS OF THE INVENTION

Figure 1:
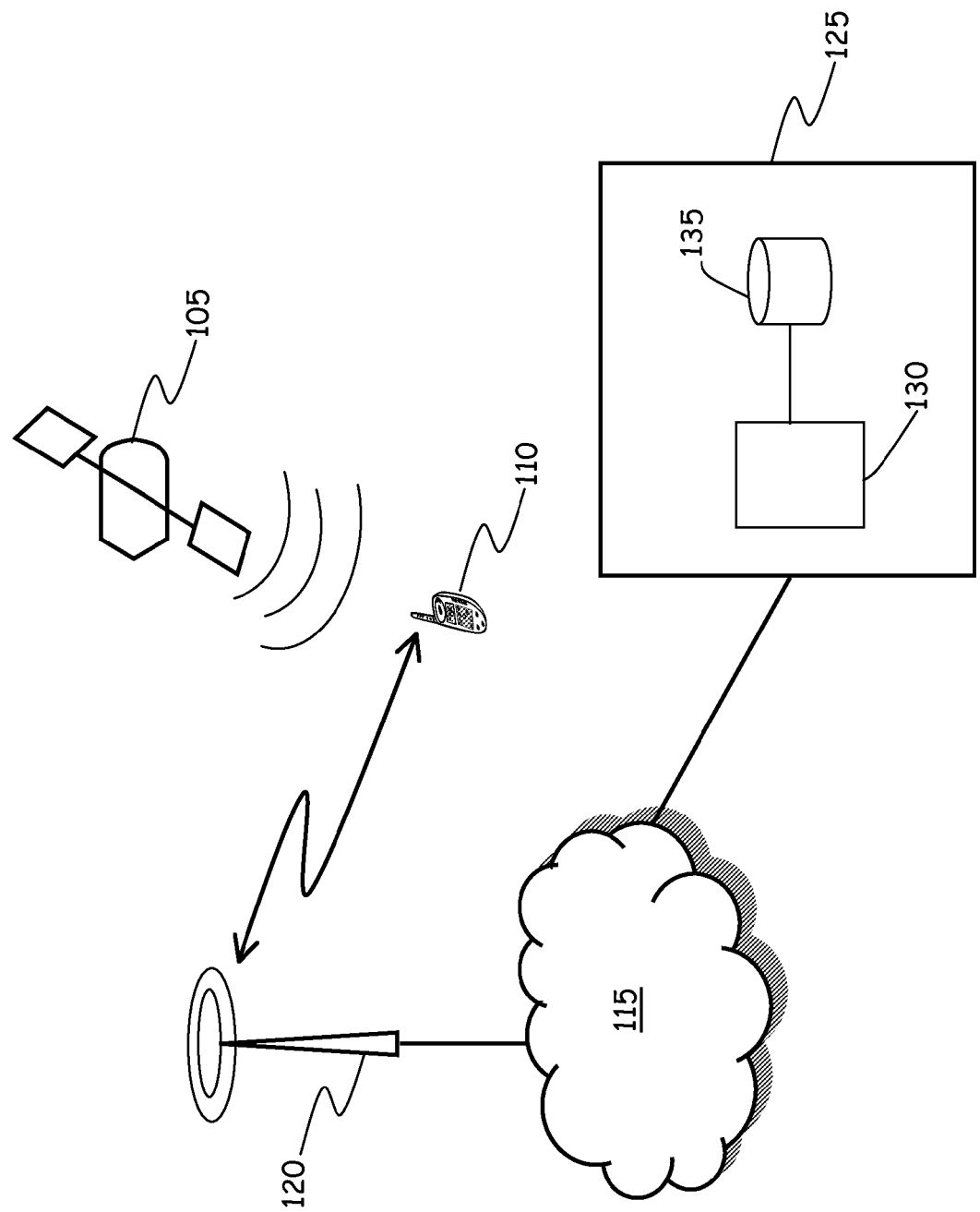
FIG. 1 schematically depicts, by way of a block diagram, a general architecture of a system wherein a solution according to an embodiment of the present invention can be implemented.

Referring to the drawings, FIG. 1 schematically shows the general architecture of a mobile communications terminal geolocation system according to an embodiment of the present invention.

Reference numeral 105 denotes a signal source, e.g. a transmitter transported by one of the plurality of satellite vehicles making up the constellation of satellite vehicles of a GNSS like the GPS. The signal source 105 is configured to transmit microwave radio carrier signals, at a prescribed frequency (e.g., the so-called "L1 frequency"), modulated (spread) by a unique scrambling code, uniquely assigned to that transmitter, and by data bits making up a navigation message. The navigation message transmitted by the generic transmitter includes inter alia the GPS satellite vehicle's orbit parameters (including the so-called "almanac" and "ephemeris"), clock corrections, and other parameters; all these data are useful for the receiver to calculate and update its location on the Earth surface.

Reference numeral 110 denotes a mobile communications terminal, like for example a cellular phone or a smartphone, more generally any device operable in a PLMN 115, like for example a GSM (General System for Mobile communications) or a UMTS (Universal Mobile Telecommunications System), having a Radio Access Network (RAN) comprising a plurality of base radio stations 120, like for example Base Transceiver Stations (BTSs) of a GSM network or NodeBs of a UMTS network. In another example, PLMN 115, can be an LTE (Long Term Evolution) network, comprising a plurality of base radio stations 120, like for example eNodeBs. Each base radio station 120 covers a respective geographic area, commonly referred to as a cell.

The mobile communications terminal 110 also includes a GNSS signal receiver, like a GPS receiver, configured to receive the signals transmitted by the signal source 105 of the GPS.

Coupled (wired or wireless) to the PLMN 115 is a service center 125, operable to provide to the mobile communications terminal 110 services aiding the process of geolocation of the mobile communications terminal. The service center 125 may include a data processing system 130, e.g. a computer, coupled to a database 135 adapted to store reference data useful for aiding the mobile communications terminal 110 in the process of determination of its geographic position, as will be described in greater detail in the following.

Figure 2:
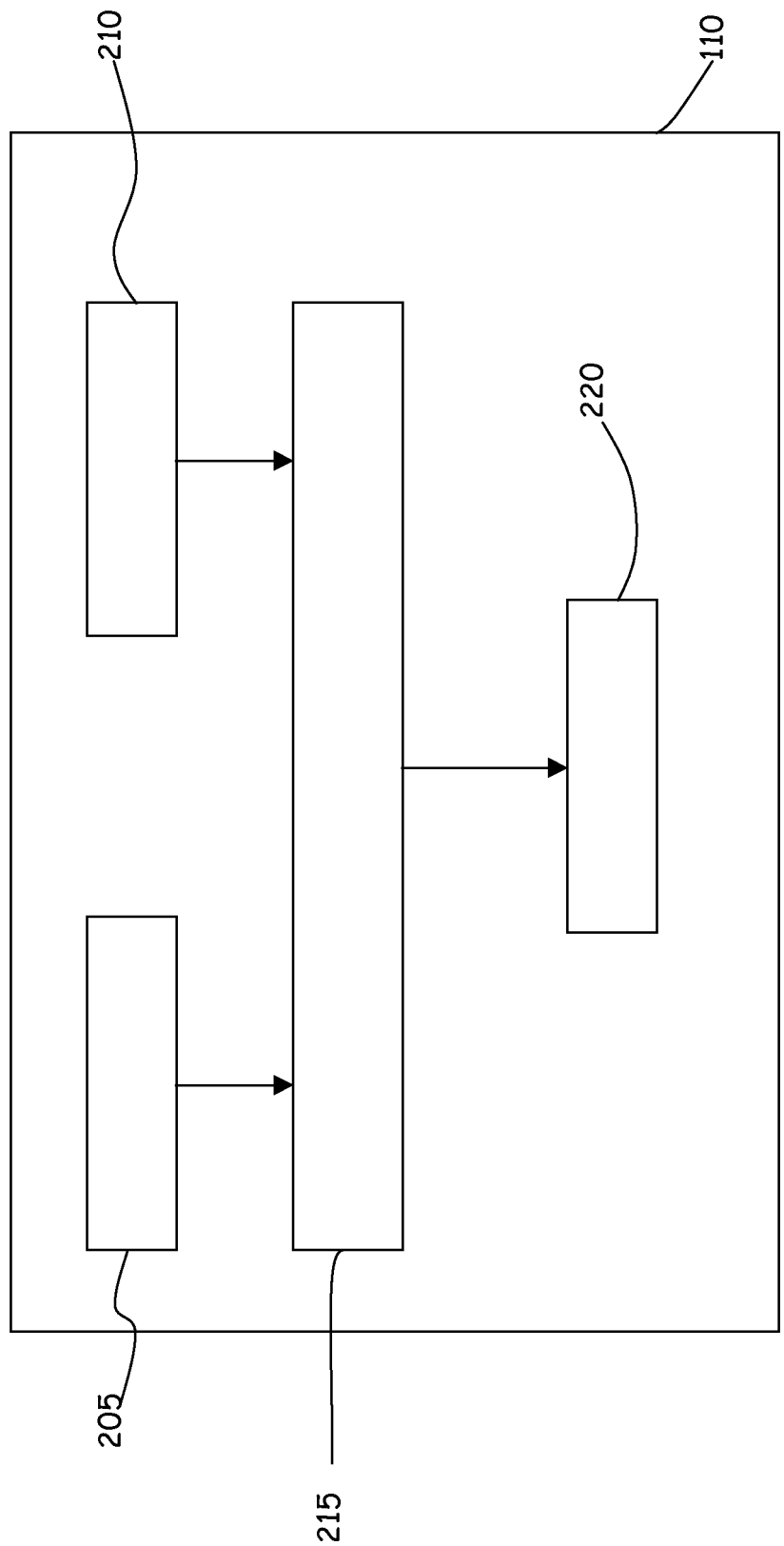
FIG. 2 is a schematic functional block diagram of a mobile communications terminal according to an embodiment of the present invention.

As schematically shown in FIG. 2, the mobile communications terminal 110 comprises a radio frequency unit 205, enabling communications with the base radio stations 120 of the PLMN 115, a GPS receiver/processor unit 210, and a control and processing unit 215, coupled to the radio frequency unit 205 and to the GPS receiver/processor unit 210, and operable to control the operation of the mobile communications terminal 110 based on firmware/software modules, stored/installed in the mobile communications terminal 110, and based on the interaction with a Subscriber Identity Module 220, e.g. a GSM SIM or a UMTS U-SIM, adapted in particular to support the user profile (including information adapted to univocally identify the subscriber to the PLMN).

A method of determining the geographic position of the mobile communications terminal according to an embodiment of the present invention will be now described. In the described embodiment, reference will be made to GPS as the Global Navigation Satellite System, although the invention can be applied to other GNSS as well. FIG. 3 depicts, in terms of a schematic flowchart, the main actions performed by the mobile communications terminal 110.

The GPS receiver/processor unit 210 in the mobile communications terminal 110 receives, decodes and processes signals transmitted by the transmitters 105 on the satellite vehicles of the GPS (block 305). In a so-called "Assisted GPS"—A-GPS—architecture, the GPS receiver/processor unit 210 in the mobile communications terminal 110 may receive assistance data (including for example the GPS satellite vehicle's orbit parameters—the almanac and the ephemeris—, an indication of the delay of the satellite transmitter clock, clock corrections, and other parameters), for example from a server (not shown in the drawings) configured to provide assistance to the GPS receivers in the processes of code and carrier phase measurement of the GPS signal and position, time and velocity estimation. In this case, the GPS receiver/processor unit 210 in the mobile communications terminal 110 does not need to decode the received signals, this function being implemented at the A-GPS server.

Generally, the GPS receiver/processor unit 210 receives signals from only a limited subset of the GPS transmitters, which are carried by satellite vehicles that are visible to the GPS receiver/processor unit 210 in the specific location where the mobile communications terminal 110 currently is.

The GPS receiver/processor unit 210, based on the received GPS signals, performs measures of pseudo-range (block 310); one pseudo-range measure is calculated for each one of the received GPS signals. As described for example in the already cited article of A. Dalla Torre et al "Analysis of the Accuracy of Indoor GNSS Measurements and Positioning Solution", the pseudo-range observation equation between the GPS receiver and the i-th satellite is:

$$R_p^i = \rho_p^i + c(dt_p - dt^i) + d_{trop}^i + d_{ionp}^i + \delta M_p^i + e_p$$

where $R_p^i$ is the pseudo-range in meters, $\rho_p^i$ is the geometric distance, $dt_p$ and $dt^i$ are the clock errors for the receiver and the satellite, $d_{trop}^i$ is the tropospheric delay and $d_{ionp}^i$ is the ionospheric delay; $\delta M_p^i$ is the component due to multipath and $\theta_p$ contains the residual error.

The GPS receiver/processor unit 210 then calculates (block 315) a PVT solution of the system of pseudo-range observation equations (one for each available satellite) using the WLS method, using the model of a Gaussian variance of the pseudo-range errors to weight the observations in the PVT solution. The normal equations can be written as:

$$x = [H^T W H]^{-1} H^T W y$$

where x is a 4-dimensional vector containing the receiver coordinates and the receiver clock offset, y is the observed minus computed vector, i.e. the pseudo-range error:

$$y = R_p^i - \rho_p^i + cdt^i + d_{trop}^i + d_{ionp}^i$$

H is the matrix of the partial derivatives and W is the weight matrix:

$$W = \begin{bmatrix} \frac{1}{\sigma_1^2} & 0 & \ldots & 0 \\ 0 & \frac{1}{\sigma_2^2} & \ldots & 0 \\ \ldots & \ldots & \ldots & \ldots \\ 0 & 0 & \ldots & \frac{1}{\sigma_n^2} \end{bmatrix}$$

where $\sigma_i$ is the variance of the observation i-th satellite, which can for example be computed during a characterization phase of the pseudo-range errors (as described for example in the article of Della Torre et al).

After calculating the PVT solution in the way just described, the receiver/processor unit 210 calculates (block 320) the post-fit residuals, i.e., the residuals of the pseudo-range observations with reference to the PVT solution calculated by the WLS method (the post-fit residuals are the differences between the measured pseudo-range values and the expected pseudo-range values calculated on the basis of the GPS fix obtained by solving the equations using the WLS method).

The receiver/processor unit 210 then performs a test on the calculated post-fit residuals (block 325). The test on the post-fit residuals is exploited for recognizing those cases in which, due to the entity of the errors in the pseudo-range measures, it is advantageous to calculate the GPS fix by means of the Monte-Carlo method, instead of the WLS method, in order to get a more accurate final fix.

In particular, in an embodiment of the present invention the test on the post-fit residuals calls for comparing the values of the post-fit residuals, normalized to the expected variance of the Gaussian error model, to the values of the $\chi_2$ distribution. The expected variance is a function of the signal/noise ratio (or of the width of the peak of the correlation function between the unique scrambling code used by the generic satellite to modulate the transmitted signal and the scrambling code used to modulate the signal locally generated at the receiver). As known in the art (see for example the cited article by Dalla Torre), the $\chi_2$ test with unknown mean is exploited for evaluating the distribution of the population, and particularly for assessing whether the residuals of the population have a distribution in agreement with what expected from the variance model computed during the characterization of the pseudo-range error and used for calculating the fix with the WLS method.

For low values of the summation of the squared post-fit residuals, particularly for values not exceeding a predetermined first, lower threshold, for example when the residuals are less than the threshold of the $\chi_2$ distribution with a number of degrees of freedom equal to that of the equation system and for a given degree of confidence (e.g., 67%), the Gaussian model of the error is regarded as a good choice, and it is not necessary to re-calculate the fix using the Monte-Carlo method, since no improvement in accuracy would be achieved (block 330, exit branch Y). The fix calculated by the WLS method is retained as the estimation of the position (block 335).

For values of the summation of the squared post-fit residuals equal to or higher than the first threshold, instead, the fix is recalculated using the Monte-Carlo method, because in such a case the error is so great that a modelling by means of a Gaussian distribution would no longer be a good approximation (block 330, exit branch N).

Essentially, an n-dimensional space of possible solutions is defined, where n is the number of variables in the system of equations to be solved (the latitude, longitude, height and clock offset). A sufficiently dense set of possible solutions (particles) are defined within this space: given a set of pseudo-range measurements, each one characterized by its own distribution of the error, for each particle in such a set the respective probability is estimated depending on the measures performed by the receiver and on the error model. The final point in the space of solutions is then calculated as the weighted average of all the particles.

The model of the error to be used in the Monte Carlo method, in order to be sufficiently accurate, should be based on quality parameters of the pseudo-range measure, in particular concerning the strength of the received signal and, optionally, on the width of the peak of the correlation function between the unique scrambling code used by the generic satellite to modulate the transmitted signal and the scrambling code used to modulate the signal locally generated at the receiver.

According to an embodiment of the present invention, in applying the Monte-Carlo method, the set of possible solutions (i.e., the set of particles) in the n-dimensional space is delimited on the basis of information made available as a result of the previous GPS fix calculation performed using the WLS method (block 340). Thanks to this, the Monte-Carlo method is used to refine the position estimation obtained by means of the WLS method.

In particular, the set of particles is determined as a region of the n-dimensional space around the particle corresponding to the position (fix) calculated by means of the WLS method and with size depending on accuracy parameters estimated by means of the WLS method like the DRMS (Distance Root Mean Square) in a plane, possibly in combination with the VDOP (Vertical Dilution Of Precision), and the TDOP (Time Dilution Of Precision), as well as the calculated post-fix residuals.

The DRMS can be calculated during the calculation of the fix using the WLS method; the DRMS provides an indication of the error in the calculated position estimation. In particular, the DRMS can be calculated as follows:

$$DRMS=\sqrt{\sigma_{x1}^2+\sigma_{x2}^2}$$

where $\sigma_{x1}$ and $\sigma_{x2}$ are the diagonal elements in the north-east-up reference system; the DRMS error measure represents from the 64% to the 77% of the measurements, and the parameter 2*DRMS covers from 95% to 98% of the solutions.

The VDOP can be estimated based on the variance $\sigma_{up}$ of the state "up" in the north-east-up reference system.

In particular, for values of the summation of the squared post-fit residuals intermediate between the first threshold and a second, higher threshold, for example a threshold of the $\chi_2$ distribution with a number of degrees of freedom equal to that of the equation system and for a degree of confidence in the range 67%-95% ($0.67<\chi_2<0.95$), the Monte-Carlo method is applied choosing a set of particles in the n-dimensional space that is limited to an area around the position estimated by the WLS method, ±1-1.5 time the DRMS and the VDOP, on the horizontal, vertical and time dimensions. This appears reasonable, since in this case the error is not very high.

If instead the value of the $\chi_2$ is high, in particular higher than 0.95, the set of particles considered is enlarged, for example to an area corresponding to 3 times the DRMS (and the VDOP), since the error interval compatible with the measurements is wider.

Once the dimension of the particles set has been determined, the Monte-Carlo method is performed and a more accurate fix is obtained as a solution (block 345).

In other words, according to an embodiment of the present invention, the mobile communications terminal performs pseudo-range measurements. Then, the mobile communications terminal estimates its geographic position exploiting the pseudo-range measurements and assuming a Gaussian model of the error, using the WLS method. Thereafter, the mobile communications terminal performs a test on the summation of then squared post-fit residuals: if the latter exceeds a first threshold, meaning that the errors affecting the pseudo-range measurements are high (and thus the Gaussian model of the error is not reliable), the fix calculated by the WLS method is not retained, and a new fix is calculated using the Monte Carlo method. In applying the Monte Carlo method, the fix accuracy predicted by the WLS method is exploited for defining the set of particles on which to apply the Monte Carlo algorithm: the higher the values of the post-fit residuals, the wider the set of particles considered. To each particle in the set of particles thus defined, a respective probability is assigned, conditioned to the pseudo-range measurements performed by the mobile communications terminal; the probabilities are based on a non-Gaussian model of the error, and the probability is the product of the probabilities in respect of the pseudo-range measurements for different satellite signals. The average value of the probabilities represents the position estimation.

In this way, it is possible to adapt the algorithm used for the estimation of the position to the specific environmental conditions, and achieve a more accurate fix.

In an alternative embodiment of the present invention, a sequential Monte Carlo method (Particle Filter method) can also be used. As mentioned in the foregoing, the sequential Monte Carlo method provides for repeating the calculations described above (selection of the particles set, assignment of respective probabilities and calculation of the solution based on the average probability) for measures performed at different time instants. As known, for the sequential Monte Carlo method to be reliable, the errors affecting the measures at different time instants should be statistically independent, i.e. uncorrelated; this is not the case when the GPS is exploited for determining the position of mobile GPS receivers, especially when the latter are embedded in mobile communications terminals, because in this case, due to the relatively low speed of the terminals the errors at subsequent time instants are not uncorrelated. Notwithstanding this, the Particle Filter method can be used by adopting a mathematical stratagem similar to that described in the cited paper of M. G. Petovello et al in respect of Kalman filtering in the presence of time correlated measurement errors.

The method described above can also be included in a sequential PVT (Position Velocy and Time) approach implementing a Kalman filtering method: for each epoch the quality of available pseudorange measurements is estimated executing the WLS and the $\chi_2$ integrity test on post fit residuals. If the $\chi_2$ test is passed the pseudorange error behaviour is compliant with the assumed Gaussian model, and the final position may be estimated with Kalman filter solution, that is the optimal approach under Gaussian errors hypothesis. If large errors are detected by the $\chi_2$ test, the assumed Gaussian error statistic is no more valid and the Kalman filter is no more the optimal approach: the final position is estimated with the sequential MonteCarlo method (or particle filter) taking into account uncorrelated error component between two consecutive epochs.

The Applicant conducted experimental trials that has proved that the Monte Carlo method described above, for fixes in respect of which the analysis of the post-fix residuals reveals the presence of significant errors, allows obtaining a reduction of the error of about 20%-30%. The experimental trials revealed that it is advantageous exploiting the Monte-Carlo method when the summation of the normalized residuals is higher than the 67th percentile of the $\chi_2$ distribution.

The present invention can be applied to both non-differential GPS and differential GPS, the latter being, as known, an enhancement to the GPS that uses a network of fixed, ground-based reference stations to broadcast the difference between the positions indicated by the satellites system and the known fixed positions; these stations broadcast the difference between the measured satellite pseudo-ranges and actual (internally computed) pseudo-ranges, and the receivers may correct their pseudo-range measurements by the same amount.

The invention claimed is:

1. A method of determining a geographic position of a user terminal comprising a receiver of signals of a global navigation satellite system, the method comprising:
    performing, at the user terminal, pseudo-range measurements related to a plurality of signals received from transmitters of the global navigation satellite system;
    calculating, at the user terminal, a first estimated position thereof by means of a weighted least square method;
    calculating, at the user terminal, post-fix residuals for the first estimated position;
    comparing, at the user terminal, the calculated post-fix residuals to a first threshold;
    in case the first threshold is exceeded, calculating, at the user terminal, a second estimated position using a Monte-Carlo method; and
    in case the first threshold is not exceeded, retaining, at the user terminal, the first estimated position as the geographic position of the mobile communications terminal.

2. The method of claim 1, wherein said comparing the calculated post-fix residuals to the first threshold comprises:
    calculating a sum of the squared values of the post-fix residuals, normalized to an expected variance of a Gaussian error model;
    calculating a $\chi^2$ distribution of the post-fix residuals;
    selecting the first threshold as a threshold of the $\chi^2$ distribution corresponding to a first predetermined degree of confidence of the measurements.

3. The method of claim 2, wherein said first predetermined degree of confidence is approximately 67%.

4. The method of claim 2, wherein said calculating a second estimated position using the Monte-Carlo method comprises:
    defining a width of a set of candidate solutions for the application of the Monte Carlo method, said width depending on information made available as a result of the calculation of the first estimated position using the weighted least square method.

5. The method of claim 4, wherein the width of the set of candidate solutions is defined as follows:
    for values of the summation of the squared post-fit residuals intermediate between the first threshold and a second, higher threshold, choosing a set of candidate solutions limited to an area around the position estimated by the weighted least square method equal to at most approximately 1.5 times the DRMS and the VDOP;
    for values of the summation of the squared post-fit residuals higher than the second threshold, choosing a set of candidate solutions extended to an area around the position estimated by the weighted least square method equal to about 3 times the DRMS and the VDOP.

6. The method of claim 5, wherein said second threshold corresponds to a second predetermined degree of confidence of approximately 95%.

7. The method of claim 1, wherein said calculating a second estimated position using a Monte-Carlo method comprises performing a sequential Monte Carlo method by repeatedly applying the Monte-Carlo method for pseudo-range measurements performed at different time instants.

8. A user terminal comprising:
    a receiver configured to receive signals from a global navigation satellite system; and
    a processor circuit configured to:
    perform pseudo-range measurements related to a plurality of signals received from transmitters of the global navigation satellite system;
    calculate a first estimated position thereof by means of a weighted least square method;
    calculate post-fix residuals for the first estimated position;
    compare the calculated post-fix residuals to a first threshold;
    in case the first threshold is exceeded, calculate a second estimated position using a Monte-Carlo method; and
    in case the first threshold is not exceeded, retain the first estimated position as the geographic position of the mobile communications terminal.

* * * * *